(12) United States Patent
Stipe et al.

(10) Patent No.: US 6,261,031 B1
(45) Date of Patent: Jul. 17, 2001

(54) HAND OPERATED SANDING TOOL

(75) Inventors: Daniel M. Stipe; David S. Chapin, both of Raleigh, NC (US)

(73) Assignee: Cooper Brands, Inc., Houston, TX (US)

( * ) Notice: Subject to any disclaimer, the term of this patent is extended or adjusted under 35 U.S.C. 154(b) by 0 days.

(21) Appl. No.: 09/372,511

(22) Filed: Aug. 11, 1999

(51) Int. Cl.⁷ .................................................. B23D 71/04
(52) U.S. Cl. ........................ 407/29.15; 407/29.1; 451/523
(58) Field of Search ........................... 407/29.15, 29.1, 407/29.14; 451/354, 356, 523, 524, 525

(56) References Cited

U.S. PATENT DOCUMENTS

| | | |
|---|---|---|
| 958,622 | 5/1910 | Gill . |
| 1,599,906 | * 9/1926 | Mcnight .............................. 451/503 |
| 2,199,962 | * 5/1940 | Beichel ............................... 451/523 |
| 2,258,536 | * 10/1941 | Burnell ............................ 407/29.15 |
| 4,137,670 | 2/1979 | Goralski ................................ 51/392 |
| 5,863,243 | * 1/1999 | Ali ...................................... 451/503 |
| 6,062,966 | * 5/2000 | Ali et al. ............................. 451/503 |

OTHER PUBLICATIONS

Sandvik. *Sandvik Saws and Tools, Professional Tools and Power Tool Accessories*. p. 21. Date Published unknown at this time.

* cited by examiner

*Primary Examiner*—Henry Tsai
(74) *Attorney, Agent, or Firm*—Coats & Bennett, PLLC

(57) ABSTRACT

A hand-powered sanding tool utilizes a rigid sanding plate, such as one made of steel. The sanding plate has a plurality of material removal teeth on at least one side for removing material from a workpiece, such as for sanding a board or a wall. The sanding plate is attached to a handle that is preferably ergonomically designed for ease of use. In preferred embodiments, the sanding plate is attached to the handle such that it may be repeatably removed and attached thereto without affecting performance. Further, in some embodiments, the sanding plate is reversible so as to provide an alternate sanding surface for use.

27 Claims, 5 Drawing Sheets

HAND OPERATED SANDING TOOL

FIELD OF THE INVENTION

The present invention relates generally to sanding tools, and more particularly to an improved hand-powered sanding tool that utilizes a rigid sanding plate for material removal.

BACKGROUND OF THE INVENTION

Hand-powered sanding tools have been utilized for a number of years in the construction and finishing industries. For instance, it is well-known to attach sandpaper to a sanding block for ease of sanding. In simplest terms, such a sanding block would typically include a rectangular gripping block with slits (or clamps) on each end for securing a sheet of sandpaper. Because sandpaper wears out quickly and because it is easily subject to ripping and tearing, more advanced sanding blocks provide an easy method of attaching and removing the sandpaper to facilitate sandpaper replacement.

Other hand-powered sanding tools have eliminated the use of traditional sandpaper. For instance, Sandvik Company offers a palm-held sander that employs a metallic sheet rather than sandpaper. According to Sandvik, the metallic sheet is made by etching one side of thin steel with acid thereby creating thousands of small points that have sharp edges. The thin metallic sheets are backed with adhesive and attached to the underside of a plastic gripping handle. The thin metal sanding surface is supported throughout its area by the plastic handle; this is because the thin metal sheets, like sandpaper, are relatively flexible.

While prior art sanding blocks are suitable for a number of applications, they suffer from some disadvantages. First, sandpaper is only useful in areas where it is directly supported by the sanding block. If the sanding paper is wider than the sanding block, then the area of the sanding paper outside the sanding block will not properly perform its function, quite simply because it is receiving little, if any, force. Likewise, the metal sanding sheets of Sandvik likewise require support from the plastic handle over their entire area in order to function properly. Second, sandpaper is notoriously short-lived; as such, sandpaper users are required to replace the sanding paper very frequently.

Thus, there remains a need for an improved sanding tool that is hand-powered. Such a sander should preferably be designed to allow the tool to reach into corners without binding on the operators hands. Further, the sander should preferably be provided with a material removal media that is long lasting, flat, and optionally reversible.

SUMMARY OF THE INVENTION

The hand-powered sander of the present invention utilizes a rigid sanding plate, such as one made of steel. The sanding plate has a plurality of material removal teeth on at least one side for removing material from a workpiece, such as for sanding a board or a wall. The sanding plate is attached to a handle that is preferably ergonomically designed for ease of use. In preferred embodiments, the sanding plate is attached to the handle such that it may be repeatably removed and attached thereto without affecting performance. Further, in some embodiments, the sanding plate is reversible so as to provide an alternate sanding surface for use.

DETAILED DESCRIPTION

Figure 1:
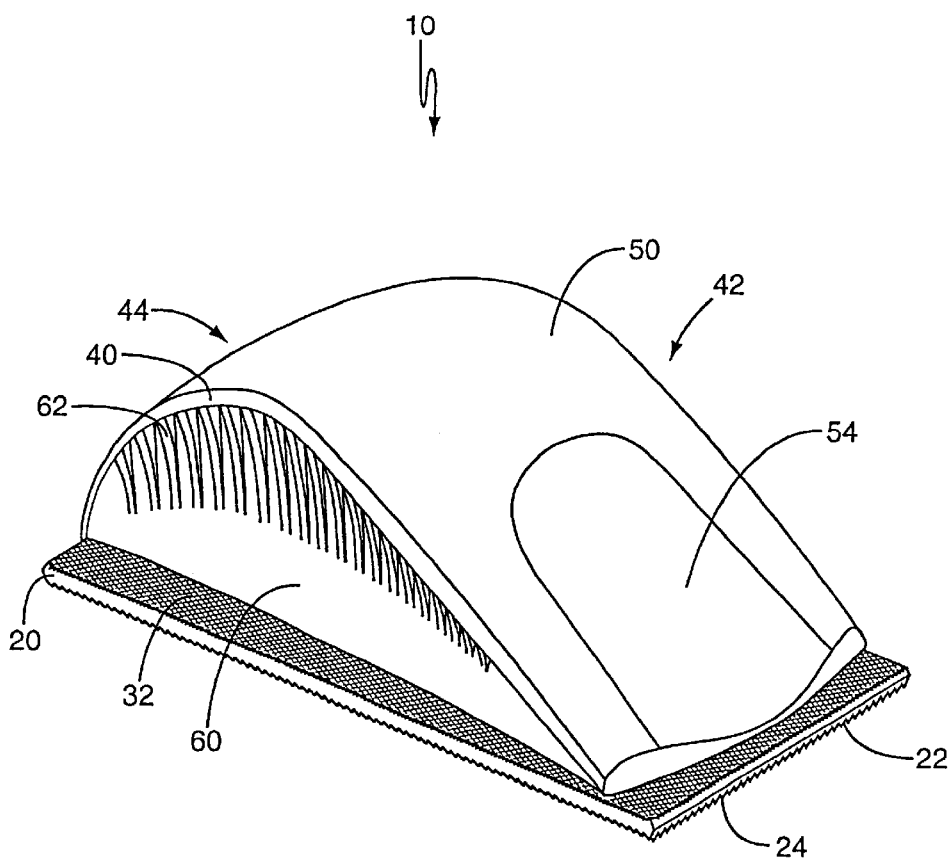
FIG. 1 is a perspective view of one embodiment of the sander according to the present invention.

The sanding tool 10 of the present invention is manually-powered and may be best illustrated in the context of sanding a wooden workpiece. However, it is to be understood that the workpiece may be made from other known materials, such as plastic, pressed paper, fiberglass, body filler, and other non-metallic materials known in the construction and craft industries. In addition, the sander 10 may be used to remove or otherwise condition paint or other coatings on a workpiece.

The sander 10 generally includes a handle 40 and a sanding plate 20. The handle 40 provides convenient gripping for the user while the sanding plate 20 bears against the workpiece to be sanded and performs the majority, if not all, of the material removal work.

The sanding plate 20 includes a first sanding surface 22, for purposes of illustration, the bottom sanding surface 22, having a plurality of material removal teeth 24 thereon. The sanding plate 20 is made from a relatively rigid material, such as steel or other hard metal. The sanding plate 20 is sufficiently rigid as to be self-supporting, as contrasted with common sandpaper or the metal sheet of Sandvik. That is, the sanding plate 20 should not be very thin, but should instead have appreciable sidewalls 26. The sanding plate 20 of the embodiment shown includes a mounting hole 28 located in the middle area of the sanding plate 20. Preferably, the mounting hole 28 lies along the central axis of the sanding plate 20, but in a non-centered location. The mounting hole 28 should be countersunk for reasons described below.

Figure 5A:
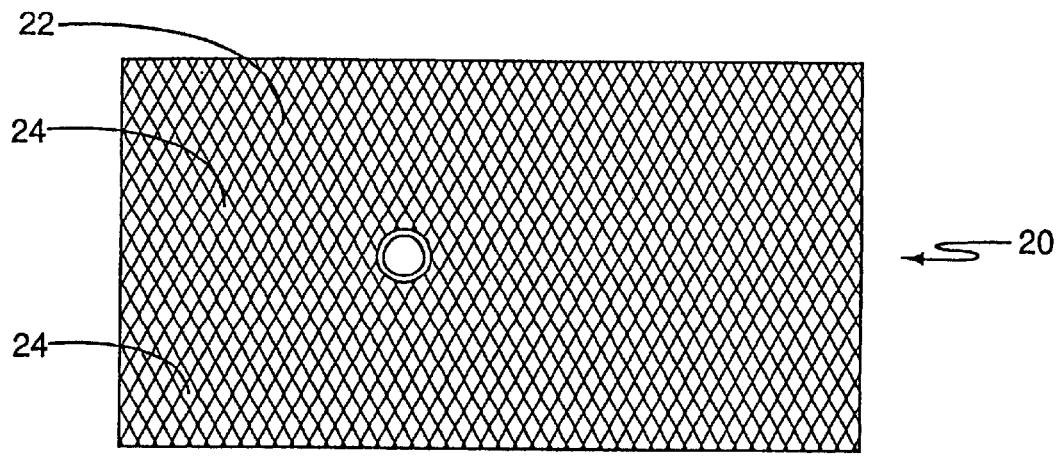
FIG. 5A is a top-view of the sanding plate showing a sanding surface having a fine coarseness.
Figure 5B:
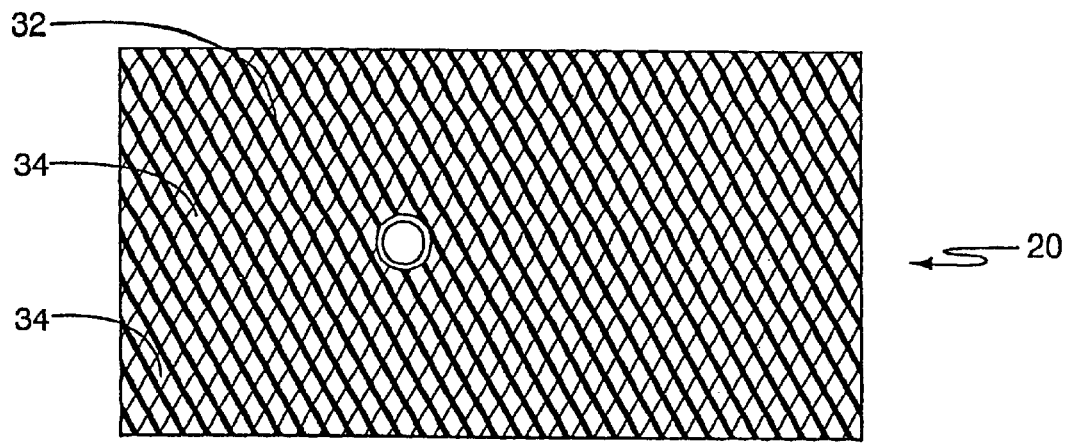
FIG. 5B is a bottom-view of the sanding plate showing a sanding surface having a medium coarseness.
Figure 5C:
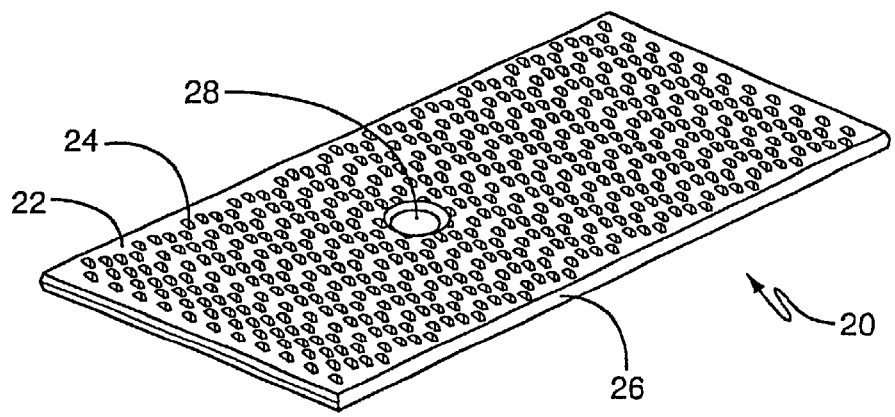
FIG. 5C is a perspective view of an alternate embodiment of the sanding plate showing a sanding surface having a high level of coarseness.

The material removal teeth 24 on the sanding plate 20 in some embodiments are formed in a manner similar to common steel file teeth. That is, the teeth 24 are formed by diagonally offset cuts so that the teeth 24 have a generally diamond shape. See FIG. 5. As is known in art of file making, such teeth 24 may be made in various levels of coarseness. Preferably, the teeth 24 are made to correspond to coarsenesses of common sandpaper grades, such as 60 grit, 80 grit, 120 grit, or 200–400 grit. Alternatively, the teeth 24 may be formed in a manner similar to common rasp teeth, such as in the shape of upright triangles. The overall pattern of such teeth 24 may be as shown in FIG. 5(c). The teeth 24 on the sanding surface 22 may be designed primarily for use in one direction, or may be designed for use in any direction, such as the teeth disclosed in U.S. patent application Ser. No. 09/076,016, which is incorporated herein by reference.

While not required, the sanding plate 20 preferably includes two or more sanding surfaces 22,32, such as a top sanding surface 32 and a bottom sanding surface 22, both having teeth (24 or 34) thereon. As shown in the Figures, two of the sanding surfaces 22,32 are preferably parallel to one another and disposed on opposing sides of the sanding plate 20. The two sanding surfaces 22,32 may be identical, thereby having the same coarseness, or the two sanding surfaces 22,32 may have differing teeth 24,34 with a different coarseness for each sanding surface 22,32.

The outer edges of the sanding plate 20 define a sanding plate perimeter. While a wide variety of perimeter shapes may be used, the perimeter is preferably rectangular with a width of at least 1½ inches and a length of at least three inches. Preferably, the sanding plate 20 has a width of approximately 2½ inches and a length of approximately five inches. The thickness of the sanding plate 20 will depend on the material used, but a thickness of approximately 0.1 inch to 0.25 inch is believed suitable for 1045 to 1095 grade steel that has been heat treated with a brine quench.

Figure 2:
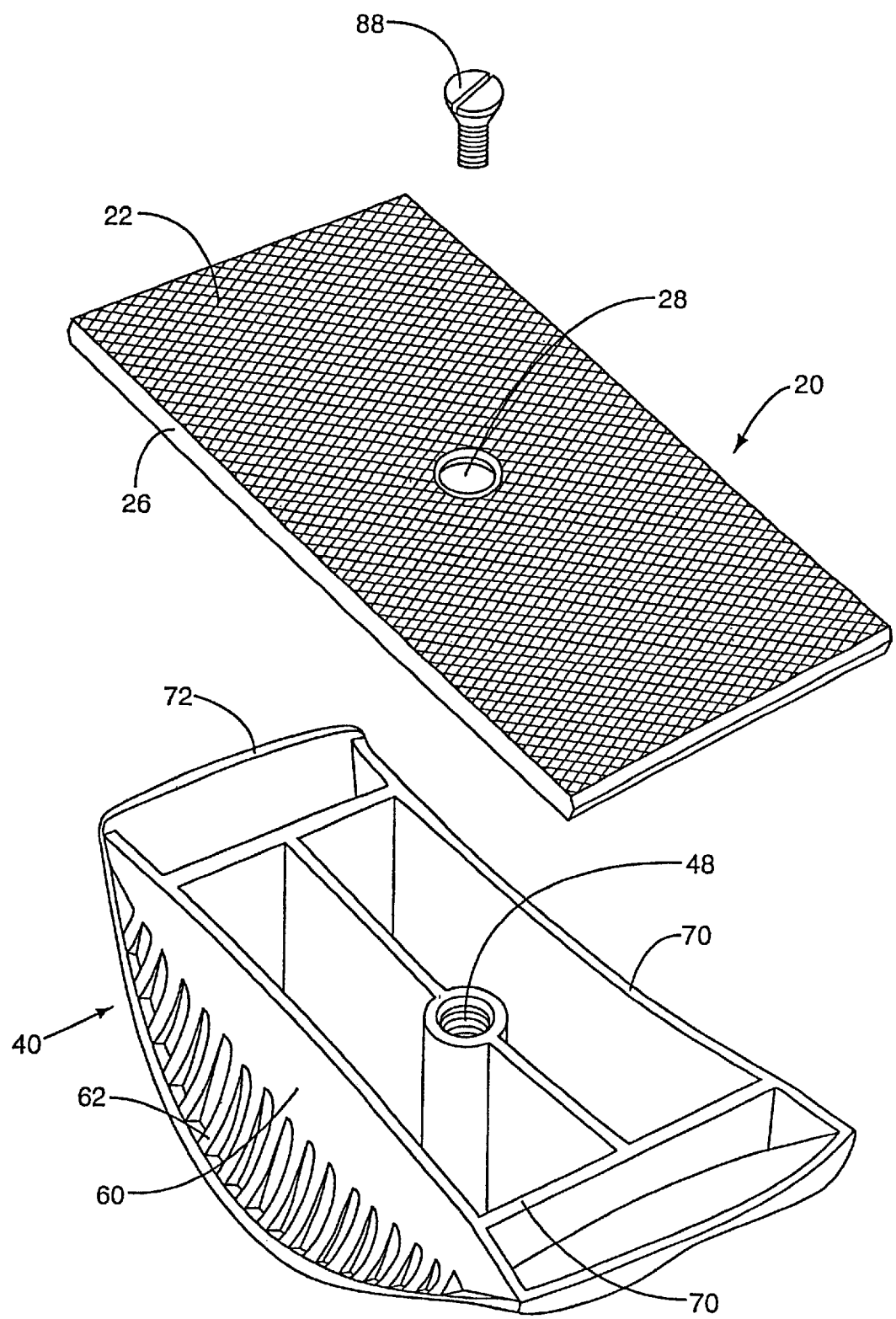
FIG. 2 is an exploded view from the underside of the sander of FIG. 1.
Figure 3:
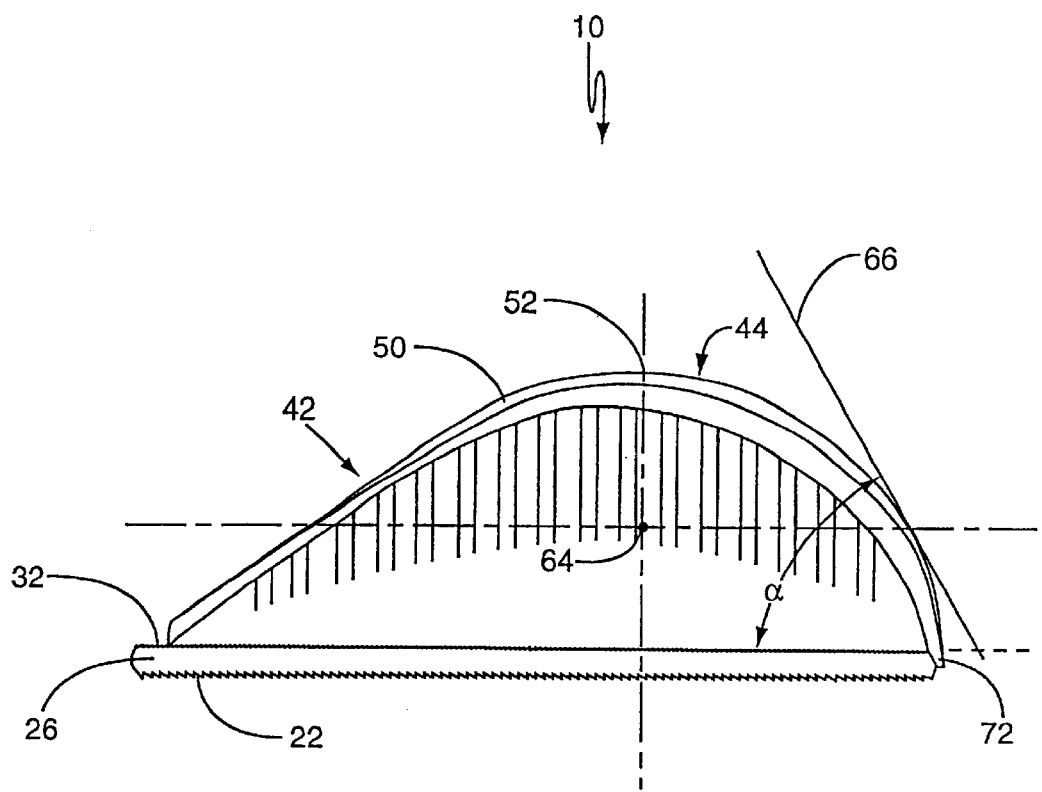
FIG. 3 is a side-view of the sander of FIG. 1.

The handle 40 provides a jig for holding the sanding plate 20. While the handle 40 may take a wide variety of forms, the handle 40 should include a mating surface 70 on a lower portion of the handle 40. The mating surface 70 is adapted to support the sanding plate 20 from above. Preferably, the mating surface 70 is generally planar. As seen in FIG. 2, the mating surface 70 does not need to be a fully filled-in plane, but may instead be formed by a suitable perimeter frame, with or without cross-members. This is because, as mentioned above, the sanding plate 20 is independently rigid. The handle 40 may be made from any suitable material known in the art, such as wood or plastic that is durable and preferably lightweight with respect to the sanding plate 20. Preferably, the handle 40 is molded from a durable plastic material such as polycarbonate, ABS, or the like.

Figure 4:
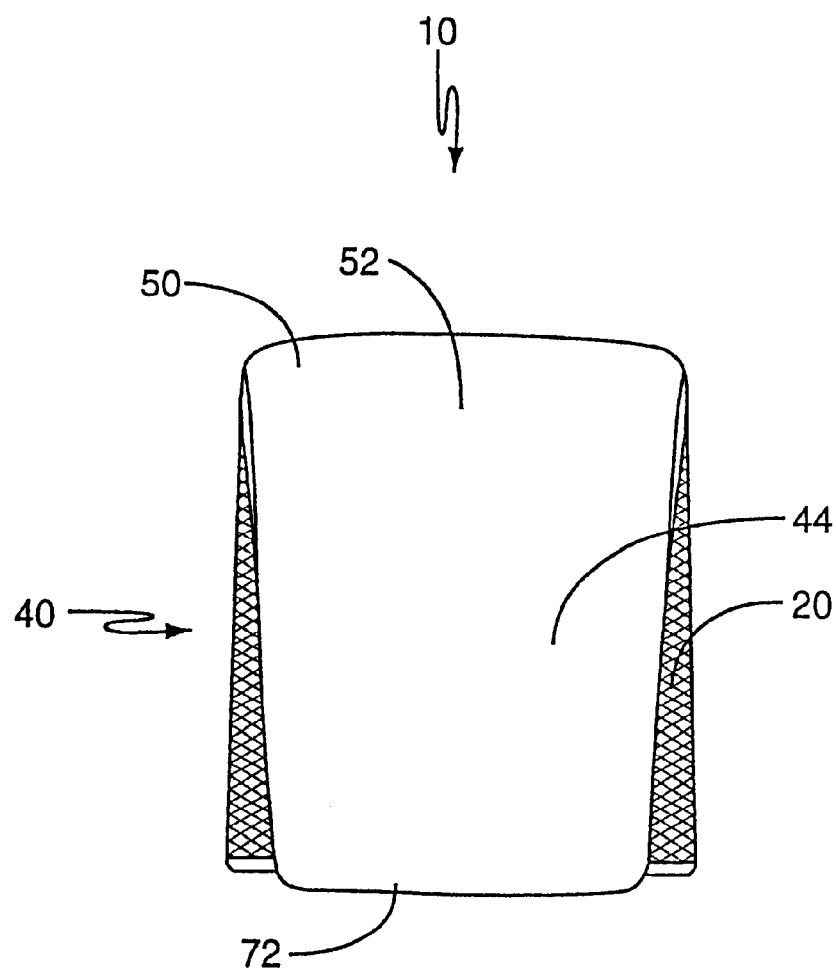
FIG. 4 is a perspective rear view of the sander of FIG. 1.

The handle 40 shown in FIGS. 1–4 includes a front portion 42 and a rear portion 44 with an upper surface, or cover, 50 supported by a plurality of side panels 60. For ease of reference with the FIG. 1, the cover 50 is disposed on the top portion of the handle 40, while the mating surface 70 is disposed on the bottom portion of the handle 40. The cover 50 includes a generally convex curved palm surface that extends substantially continuously from the rear portion 44 to the front portion 42. Indeed, the palm surface preferably extends continuously from the rear edge of the handle 40 to the front edge. This palm surface should be textured to facilitate consistent non-slip gripping by a user's sweaty hand. In some embodiments, the front portion 42 of the cover 50 may be relatively planar with a smoothly indented central area, as shown in FIG. 1, for receiving the user's middle fingers. In addition, the cover 50 is preferably tapered outwardly from the rear, as shown in FIG. 4.

The high point, or apex 52, of the cover 50 is preferably closer to the rear 44 than to the front 42 so that the force of a user's push is less likely to twist the rear 44 of the sander 10 upward, thereby disengaging the sanding plate 20 from the workpiece. In addition, the rear portion 44 of the cover 50 is preferably shaped such that a tangent line 66 taken at a point level with the midpoint 64 between the apex 52 and the mating surface 70 forms an angle a with respect to the mating surface 70 of 45° or more. This is so that a larger portion of the force supplied by the user is along the sanding surface 22 of the sanding plate 20 rather than down into the workpiece.

The cover 50 is supported from below by side panels 60 that run generally from the underside of the cover 50 to the mating surface 70. The side panels 60 may be of any suitable shape and, in some embodiments, may extend out the edge of the cover 50. However, the side panels 60 are preferably recessed with respect to the cover 50. Recessed side panels 60 allow the user to safely grasp the handle 40, even when the sanding plate 20 is moved close to corners. In addition, the side panels 60 are preferably slightly concave so as to better engage the user's fingers (including thumb) that are not engaged by the cover 50 during pushing and to allow the user to lift the sander 10 from the sides. When the side panels 60 are recessed, the cover 50 may be further supported by a plurality of ribs 62 joined to the side panels 60. The ribs 62 are preferably smoothly contoured on the outside and spaced apart so as to provide an additional gripping surface for the user's fingers that engage the sides of the handle 40.

The rear of handle 40 may include a downwardly extending flange 72. This flange 72 may be only a single point, but preferably takes the form of an elongate lip. The flange 72 extends down below the plane formed by the mating surface 70. The flange 72 is intended to supply a ridge for the sanding plate 20 to butt against, thereby helping to align the sanding plate 20 with respect to the handle 40. Further, the flange 72 helps transmit force from the user (exerted on the handle 40) to the sanding plate 20 by pushing against the rear edge of the sanding plate 20. Also, the presence of the flange 72 helps prevent the user's hand from being pinched between the handle 40 and the sanding plate 20.

The sanding plate 20 may be attached to the handle 40 by any known means. For the embodiment shown in FIG. 2, the sanding plate 20 is attached to the handle 40 by a screw 88 extending through the mounting hole 28 on the sanding plate 20 and into a threaded hole 48 on the bottom of the handle 40. The threaded hole 48 should be slightly recessed with respect to the plane formed by the mating surface 70 so as to ensure contact between the mating surface 70 and the sanding plate 20. If necessary, a metal insert (not shown) may be used to help form and reinforce the threaded hole 48. The combination of this contact and the optional flange 72 help relieve lateral stress on the threaded hole 48. If a screw 88 is used as the fastening means between the sanding plate 20 and the handle 40, the screw 88 should be a flat head type so that the head of the screw 88 is fully recessed with respect to the sanding surface.

The sander 10 is used in the typical fashion. The user's hand is brought into contact with the palm surface of the cover 50, preferably with base of the users hand against the rear portion 44 of the handle 40. It should be noted, however, that the handle 40 may be grasped from other directions as well, if needed.

Because the preferred sanding plate 20 is made from a hard metal, such as steel, the teeth 24,34 on the sander 10 last much longer than traditional sandpaper. Further, the material removal capability of the sander 10 with hard metal sanding plate 20 may be much more than traditional sandpaper, with on the order of 25 to about 100 times faster material removal rates easily achievable.

In preferred embodiments with repeatably removable sanding plate 20, the sanding plate 20 may be removed from the handle 40 by simply unscrewing the screw 88 whenever the sanding plate 20 wears out or becomes clogged. A new sanding plate 20 may then be installed by placing the sanding plate 20 against the optional flange 72 and securing the screw 88 through the mounting hole 28 into the threaded hole 48. In embodiments having reversible sanding plates 20, the sanding plate 20 may be turned over in a similar manner to reach a new sanding surface 32, for instance to change coarseness of the sander 10.

Further, with a metallic sanding plate 20 and a plastic handle 40, the majority of the mass of the sander 10 is located in the sanding plate 20. This arrangement is believed to help hold the sander 10 firmly in contact with the workpiece and reduce strain on the users wrist.

The discussion above has assumed that a screw 88 is used to removably attach the sanding plate 20 to the handle 40. This arrangement is one that allows the sanding plate 20 to be repeatably attached and detached from the handle 40. However, other fastening approaches may be used, such as quarter-turn fasteners, magnets or electro-magnets, adhesive, glue, inset molding, and the like. Of course, using adhesives, glue, or inset molding would permanently attach the sanding plate 20 to the handle 40, so such approaches are believed to be inferior.

The material removal tool 10 described above is hand-powered. The combined configuration the handle 40 and the sanding plate 20 result in a tool 10 that may be easily used in a variety of applications. The handle 40 of the preferred embodiments is designed to allow the tool 10 to reach into corners without binding on the operators hands. Further, the tool 10 is preferably provided with a sanding plate 20 that is efficient and long lasting, with the sanding plate 20 preferably being reversible to access another sanding surface, optionally with another degree of coarseness.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A hand sanding tool, comprising:
   a handle adapted to be gripped by a user on an upper portion thereof and having a mating surface on a lower portion thereof;
   a rigid metallic sanding plate secured to said handle and disposed below and generally parallel to said matins surface; said sanding plate having at least a first substantially planar sanding surface distal from said handle having a plurality of material removal teeth thereon; and
   said handle including a flange extending generally perpendicular to said sanding surface and bounding a rear portion of said lower mating surface, said flange in contact with said sanding plate and transmitting forward force applied to said handle to said sanding plate.

2. The tool of claim 1 wherein said sanding plate secures to said handle so as to allow for repeated attachment to and detachment from said handle.

3. The tool of claim 1 wherein said sanding plate secures to said lower mating surface via a removable fastener.

4. The tool of claim 1 wherein said sanding plate includes a second substantially planar sanding surface having a plurality of material removal teeth thereon, said second sanding surface non-planar with said first sanding surface.

5. The tool of claim 4 wherein said second sanding surface is disposed parallel to said first sanding surface and between said handle and said first sanding surface.

6. The tool of claim 5 wherein said first sanding surface and said second sanding surface have substantially similar coarseness.

7. The tool of claim 5 wherein said first sanding surface and said second sanding surface have substantially different coarseness.

8. The tool of claim 1 wherein said sanding plate has an outer perimeter and wherein, with said sanding plate secured to said handle, said handle fits inside said perimeter on at least three sides.

9. The tool of claim 1 wherein said sanding plate provides the majority of mass for said tool.

10. The tool of claim 1 wherein said sanding plate is steel and said teeth are file teeth and wherein said sanding plate is more than 2 inches wide and more than 3 inches in length.

11. The tool of claim 1 wherein:
   a) said handle further includes a front portion and a rear portion;
   b) said upper portion includes a generally convex curved upper surface opposite said mating surface extending substantially continuously from said rear portion to said front portion;
   c) said handle further includes side panels positioned between said upper surface and said lower mating surface and recessed with respect to said upper surface; and
   d) said flange aligns said sanding plate with respect to said handle.

12. The tool of claim 11 wherein said side panels having a concave profile when viewed from above.

13. The tool of claim 11 wherein said upper surface has a width substantially as large as said sanding plate and generally tapered outwardly in the direction from said rear portion to said front portion.

14. The tool of claim 11 wherein said upper surface extends substantially through said front portion, said upper surface extending substantially through said front portion being substantially planar with a smoothly indented central area.

15. The tool of claim 11 wherein said sanding plate includes a mounting hole in a middle portion thereof and said handle further includes a corresponding threaded hole on the underside thereof.

16. The tool of claim 15 wherein said threaded hole is recessed with respect to said mating surface of said handle.

17. The tool of claim 15 wherein said sanding plate includes a mounting hole non-centered along the length of said sanding plate.

18. The tool of claim 11 further including a plurality of spaced apart ribs disposed below said upper surface and outside said side panels of said handle and interconnecting said upper surface and said side panels.

19. The tool of claim 11 wherein said upper surface includes an apex and wherein said upper surface is at least two inches wide at the apex of said upper surface.

20. The tool of claim 11 wherein said mounting surface is generally planar and wherein said handle includes a vertical midpoint halfway between said mounting surface and the apex of said upper surface, and wherein a line drawn tangential to said upper surface at the height of said vertical midpoint forms an angle with respect to said mounting surface of 45° or more.

21. A hand sanding tool, comprising:
   a handle having a lower mating surface and a flange bounding a rear portion of said lower mating surface;
   a detachable sanding plate selectively attached to said handle and disposed below, and substantially parallel to, said lower mating surface; said sanding plate attached to said handle in a fashion allowing for repeated attachment and detachment from said handle; said sanding plate having at least a first substantially planar sanding surface distal from said handle having a plurality of material removal teeth thereon;
   said flange extending generally perpendicular to said sanding surface and in contact with said sanding plate and transmitting forward force applied to said handle to said sanding plate;

said sanding plate having an outer perimeter and wherein, with said sanding plate attached to said handle, said handle fits substantially within said perimeter on at least three sides;

said sanding plate being metallic and rigid independent of said handle.

22. The tool of claim 21 wherein said sanding plate includes a distinct second substantially planar working surface having a plurality of teeth thereon, said second working surface non-planar with said first sanding surface and disposed parallel to said first sanding surface, between said handle and said first sanding surface.

23. The tool of claim 21 wherein said first sanding surface and said second sanding surface have substantially similar coarseness.

24. The tool of claim 21 wherein said first sanding surface and said second sanding surface have substantially different coarseness.

25. A hand sanding tool, comprising:

a handle having:
- a front portion and a rear portion;
- a lower mating surface and a elongate flange bounding a rear portion of said lower mating surface;
- a generally convex curved upper surface opposite said lower mating surface running smoothly from said rear portion to said front portion; said upper surface generally tapered outwardly from rear to front;
- side panels recessed with respect to said upper surface, said side panels having a concave profile when viewed from above;
- a plurality of spaced apart ribs disposed below said upper surface and outside said side panels of said handle and interconnecting said upper surface and said side panels;

a detachable metallic and independently rigid sanding plate attached to said handle and disposed below, and substantially parallel to, said lower mating surface; said sanding plate attached to said handle in a fashion allowing for repeated attachment to and detachment from said handle;

said sanding plate having at least a first substantially planar sanding surface distal from said handle having a plurality of teeth thereon and a second substantially planar sanding surface distinct from said first sanding surface and having a plurality of teeth thereon, said second sanding surface non-planar with said first sanding surface and disposed parallel to said first sanding surface, between said handle and said first sanding surface;

said flange extending generally perpendicular to said sanding surface and in contact with said sanding plate and transmitting forward force applied to said handle to said sanding plate; said flange tending to preserve the relative horizontal angular orientation of said sanding plate to said handle; and said sanding plate having an outer perimeter and wherein, with said sanding plate attached to said handle, said handle fits substantially within said perimeter on at least three sides.

26. The tool of claim 25 wherein said first sanding surface and said second sanding surface have substantially similar coarseness.

27. The tool of claim 25 wherein said first sanding surface and said second sanding surface have substantially different coarseness.

* * * * *